May 16, 1961     P. S. VAUGHAN     2,984,229
MULTI-FUEL SUPPLY SYSTEM
Filed Dec. 5, 1956     2 Sheets-Sheet 1

PAUL S. VAUGHAN
*INVENTOR.*

BY *Maurice W. Graly*

ATTORNEY

PAUL S. VAUGHAN
INVENTOR.

ATTORNEY

United States Patent Office 2,984,229
Patented May 16, 1961

2,984,229
MULTI-FUEL SUPPLY SYSTEM

Paul S. Vaughan, Schenectady, N.Y., assignor to Alco Products, Incorporated, New York, N.Y., a corporation of New York Filed Dec. 5, 1956, Ser. No. 626,374

7 Claims. (Cl. 123—139)

This invention relates to a fuel delivery system for internal combustion engines and more particularly to apparatus to selectively control the alternate delivery of two fuels to such an engine.

It has been found, particularly in the case of compression ignition engines, that some of the heavy low grade and less expensive fuels perform satisfactorily at high loads of the engine but that they are unsatisfactory at low loads. These low grade fuels may cause corrosion, however, and give rise to other difficulties if allowed to remain in the injection equipment when the engine is not running. Consequently, a system is desirable which supplies heavy low grade fuel to an engine operating under heavy load conditions and light grade fuel when it is operating under light load conditions, the system to include means for removing the heavy fuel from the system during shut down of the engine.

In such a system, it is necessary that mixing of the two fuel be held to a minimum. Such intermixing results in a fuel which may be unstable. It is likely to carbonize in the engine and cause incomplete combustion with resultant smoking of the engine and inefficient operation. Furthermore, such an unstable mixture clogs the cleaning filters. In a system wherein the fuels are permitted to intermix during switchover operation, there is unnecessary depletion of the high grade fuel supply.

The principal object of the invention, therefore, is to provide such apparatus to selectively supply heavy and light fuel to an engine to meet varying demands of heavy and light load conditions of the engine, the apparatus including means to remove heavy fuel from and supply light fuel to the injection equipment during shut down of the engine.

Another object of the invention is to provide such apparatus to control the supply of heavy and light fuels to an engine in such manner that the engine starts and shuts down on high grade light fuel but operates on heavy low grade fuel above a predetermined load.

A further object of the present invention is to provide a multi-fuel system for an internal combustion engine including means to minimize the intermixing of the light high grade fuel with the heavy low grade fuel during the operation of switching over from one fuel to another.

Other and further objects of the present invention will be apparent from the following description, the accompanying drawings and the appended claims.

Figure 1:
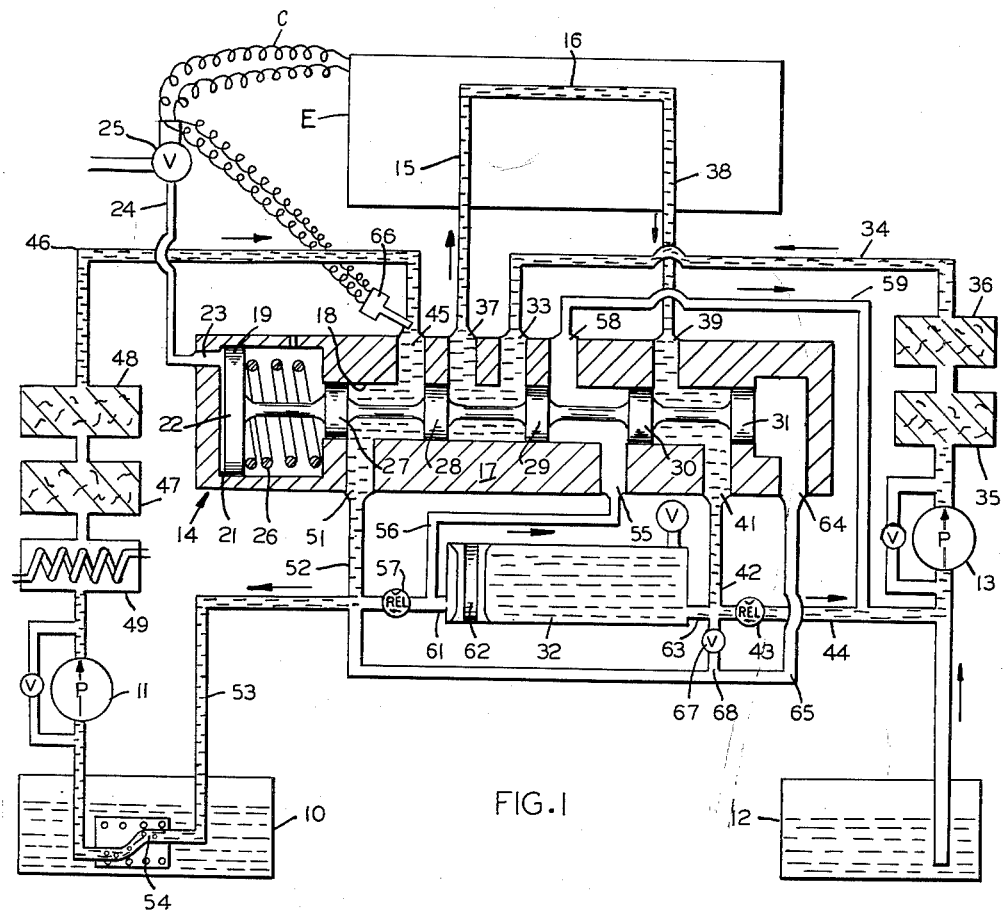

In the drawings, Fig. 1 is a diagrammatic illustration of the apparatus of the present invention operating to supply light high grade fuel to the engine.

Figure 2:
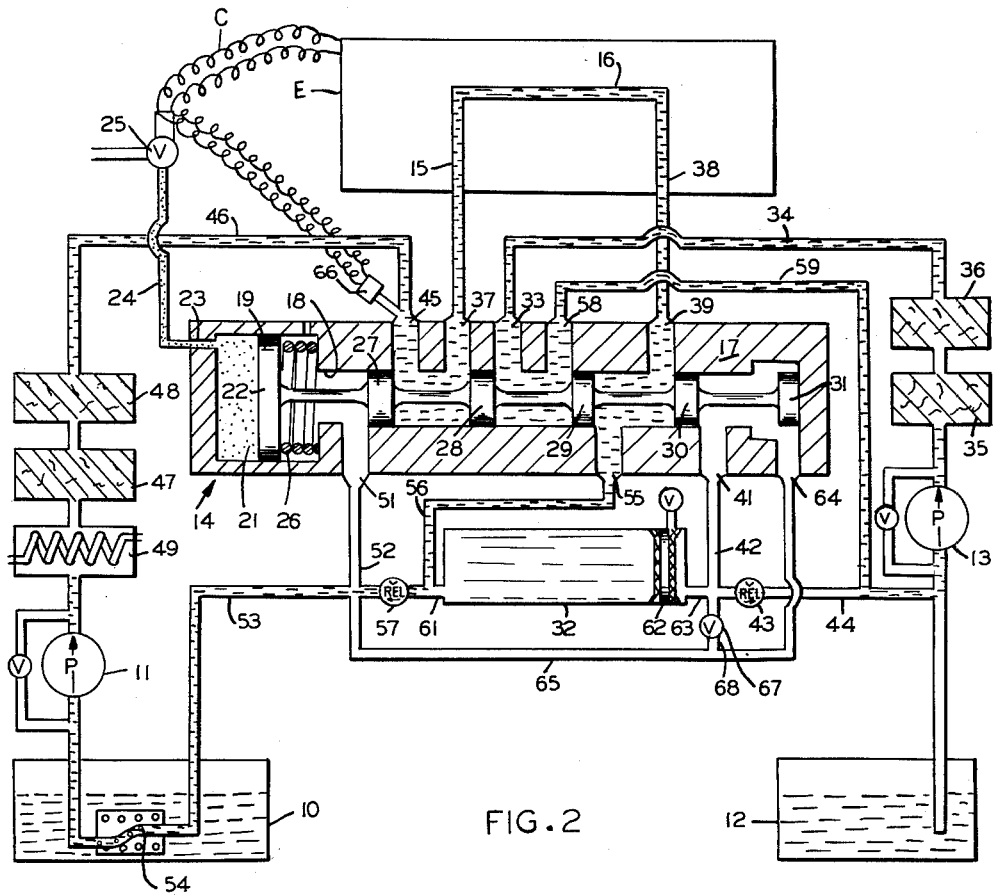

Fig. 2 is a diagrammatic illustration of the apparatus of the invention operating to supply heavy low grade fuel to the engine.

Referring now to Fig. 1, the fuel injectors of engine E are supplied with heavy fuel from tank 10 through the heavy fuel transmission system which includes pump 11 and with light fuel from tank 12 through the light fuel transmission system which includes pump 13. The flow of the respective fuels to the engine is governed by a control valve, generally indicated at 14, which receives the fuels from the fuel transmission systems and transmits them through passage 15 to header 16 for distribution to the fuel injectors (not shown).

Control valve 14 is of the reciprocable plunger type and comprises a body 17 having an axial bore 18 within which plunger 19 is slidable. A chamber 21 is formed within the body of the valve and plunger head 22 is arranged in a sliding fit in the chamber. A port 23 connects valve chamber 21 with an air line 24, and as air pressure is admitted to the chamber, as permitted by solenoid supply-waste valve 25, the plunger is forced inwardly or to the right as viewed in Fig. 1. A return spring 26 opposes such inward movement of the plunger and returns it to its outer position when the air pressure in the chamber 21 is dropped through solenoid supply-waste valve 25. Plunger 19 has five axially spaced control surfaces 27–31 connected by intermediate portions of reduced diameter. Axial bore 18 has a plurality of ports (to which reference numerals are hereinafter applied) establishing communication with the fuel transmission system, with the heater, with the fuel return lines, and with a receiver tank 32, the purpose of which will be later described. These ports are controlled by plunger 19, and as the latter is moved inwardly or outwardly under the control of solenoid valve 25, fuel is supplied and returned from the engine header or otherwise distributed through the apparatus in accordance with the invention.

Thus when it is desired to operate the engine on light fuel, plunger 19 is positioned outwardly (to the left in Fig. 1). Control surfaces 28 and 29 are then so located that port 33 receives light fuel from line 34 to which it is supplied from tank 12 by pump 13 and in which it is filtered at 35 and 36. Fuel thus received passes through bore 18 and port 37 to line 15 to header 16 and thence to the fuel injectors. The flow capacity of the system is designed to be greater than necessary to meet the demands of the fuel injectors of the engine and provision is therefore made for the return flow of the excess fuel. Fuel in excess of injector demands returns through line 38 to port 39 whence it passes through valve bore 18, port 41, line 42, relief valve 43, and line 44 to the suction side of pump 13. That is to say, pump 13 is in continuous operation and light fuel circulates through the system at all times. While the light fuel is thus supplying the engine, port 45 receives heavy fuel from line 46 to which it is supplied from tank 10 by pump 11 and in which it is filtered at 47 and 48 after passing through heater 49. This heavy fuel passes through the valve bore 18 and out of the valve through port 51 whence it is returned to the suction side of pump 11 through lines 52 and 53. Line 53 communicates with perforated pipe section 54 which permits pump 11 to draw fuel from the tank initially. Heavy fuel passing from line 53 to pipe 54 does not return to the tank but continues through pipe 54 by the suction of pump 11. This eliminates the necessity of continuously heating new fuel from tank 10. Once heated, the fuel is circulated until supplied to the injectors. The perforations in pipe 54 serve not only to draw additional fuel from tank 10 into line 46 but also to vent any air in the fuel passing therethrough. Circulation of fuel in the heavy fuel system continues in a closed circuit during the period of light fuel operation of the engine.

Refer now to Fig. 2, which shows the apparatus in the operating arrangement in which heavy fuel is supplied to the engine header. The plunger 19 is positioned inwardly or to the right. Heavy fuel supplied through line 46 by pump 11 passes through heater 49 and filters 47 and 48. It enters the valve through port 45 and passes out of the valve through port 37 to line 15 to the engine header 16 whence it is supplied to the injectors. As in the case of the light fuel, as heretofore described, more heavy fuel is supplied to the header than required by the engine and the excess is returned through line 38 to port 39 whence it enters the control valve. This return fuel leaves the valve through port 55, as permitted by the position of control surfaces 29 and 30, passes through line 56, relief valve 57, line 53 and pipe 54 (which passes through tank 10 in the manner previously described) to the suction side of pump 11. Pump 11 is in continuous operation and heavy fuel circulates through the system at all times. While the heavy fuel is thus supplying the engine, port 33 receives light fuel from line 34 whence it passes into valve bore 18 and out through port 58 to lines 59 and 44 to return to the suction side of pump 13. Circulation of light fuel in the system thus continues in a closed circuit during the period of heavy fuel operation of the engine.

Let us assume now that the engine is operating on light fuel (see Fig. 1) and that it is desired to change over to heavy fuel (see Fig. 2). The plunger 19 is in outward position, as shown in Fig. 1, so by means of valve 25 it is shifted to inward position as shown in Fig. 2. Port 37 is thus put out of communication with light fuel line 34 and into communication with heavy fuel line 46. The light fuel from line 34, which is continuously under the pressure of pump 13, is now routed from port 33 through valve bore 18, port 58, return line 59 and line 44 to the suction side of pump 13. Relief valve 43, being a one-way unit, prevents any light fuel from passing therethrough. That is to say, the light fuel circulates through a closed system. The heavy fuel, under the pressure of pump 11, is routed from port 45, through valve bore 18, port 37, line 15 to header 16 and the injectors. More fuel is supplied than required by the engine and the excess continues through return line 38, port 39, valve bore 18, port 55, lines 56 and 53 to return to the suction side of pump 11. The light fuel trapped in line 15, header 16 and return line 38 by the shift of the valve plunger is displaced by the entering column of heavy fuel and moves through the valve bore 18, port 55, line 56 to encounter relief valve 57. Valve 57 is set at a predetermined resistance which is sufficient to divert the column of light fuel through branch line 61 into receiver tank 32.

Tank 32, which is preferably cylindrical, has a floating piston 62 which is moved to the right in Fig. 1 in response to the pressure of the light fuel column. Heavy fuel stored in the tank on the other side of the piston 62 during the previous operation of the engine on light fuel is displaced and passes out through branch passage 63 whence it is routed through line 42, into the control valve through port 41 and out of the valve through port 64 and then back to the suction side of pump 11 through lines 65 and 53. As piston 62 moves to the right, of course the tank fills with light fuel from line 56. The capacity of tank 32 is accurately determined so that it receives and stores exactly the amount of light fuel contained in the column displaced from line 15, header 16, and line 38. The heavy fuel following the displaced column then advances through relief valve 57 and line 53 back to the suction side of pump 11.

When it is desired to change over from heavy fuel to light fuel, the action which takes place is substantially the reverse of the action just described. Plunger 19 is shifted to the left by the action of return spring 26 in response to the venting of chamber 21 by valve 25. Port 37 is then brought into communication with line 34 through port 33 and valve bore 18 and the light fuel, under pressure of pump 13, displaces the column of heavy fuel remaining in line 15, header 16, and return line 38. This fuel column advances through valve bore 18, port 41, line 42, branch line 63 into the receiver tank 32. Relief valve 43 is set at a predetermined pressure so that the displaced heavy fuel forces piston 62 to the left. As previously described, the capacity of tank 32 is adapted to receive the exact amount of fuel in the displaced column. As piston 62 moves outwardly, the light fuel stored in the tank on the other side of piston 62 is forced out through branch line 61, line 56, port 55, valve bore 18, port 58, lines 59 and 44 to the suction side of pump 13.

Solenoid supply waste valve 25 disposed in air line 24 controls the supply of air pressure to chamber 21. It is a conventional valve energized by a circuit C under the control of the engine operator. It forms no part of this invention and therefore no further description is deemed necessary. Extending into fuel line 46 adjacent port 45 is a temperature switch 66 which is connected in series with solenoid supply waste valve 25. It serves to override the operation of valve 25 in case fuel entering port 45 has not reached a predetermined temperature. That is to say, even though the engine operator closes the circuit to energize the solenoid valve 25 to switch over to heavy fuel, temperature switch 66 automatically overrides the operation of valve 25 until the temperature of fuel in line 46 has reached a predetermined degree.

When the engine is slowed down during shut-down operation, the apparatus automatically switches over to light fuel. Therefore, when the engine has come to a complete stop, the supply line, the header, and the return line have light fuel therein. The heavy fuel circulating in the closed circuit drains back to the tank when pump 11 stops. All heavy fuel with the exception of fuel in receiver tank 32 is thus drained away. A manual valve 67 in branch 68 is provided to drain heavy fuel from receiver tank 32 through branch 63, branch 68, line 65 and line 53 to the tank 10.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. A multi-fuel supply system for an internal combustion engine comprising a fuel header; a valve adapted to be set in a first and in a second position; a fuel passage from the valve to the header; a return fuel passage from the header to the valve; a passage having a first pump therein to supply a first fuel to the valve; a return passage from the valve to said first supply passage thus to form a fuel circuit; a passage having a second pump therein to supply a second fuel to the valve; a return passage from the valve to said second fuel supply passage thus to form a second fuel circuit; said valve operable in a first position to direct the first fuel to the passage to the header and the second fuel to its return passage so that the second fuel circulates through its fuel circuit, said valve operable in a second position directs the second fuel to the passage to the header and the first fuel to its return passage so that the first fuel circulates through its fuel circuit; means to move the valve from first to second position and from second to first position; fuel storage means; means connecting the fuel storage means and the first fuel return passage; and means connecting the fuel storage means and the second fuel return passage, the arrangement of the parts being such that when the valve is set in its first position fuel supplied by the first pump to the header displaces second fuel in the header and in the passages connecting the header and the valve so that it moves through the valve to the second fuel return passage and into the storage means and when the valve is set in its second position the second fuel supplied by its pump to the header displaces the first fuel in the header and in the passages connecting the header and the valve so that it moves through the valve to the first fuel return passage and into the storage means.

2. A multi-fuel supply system, according to claim 1, in which the valve is a reciprocable slide valve having a plunger.

3. A multi-fuel supply system, according to claim 1, in which the fuel storage means includes a storage cylinder and a floating piston, the capacity of the cylinder equalling the volume of fuel displaced from the header and the passages to and from the header when the valve is moved from first to second position.

4. A fuel system for alternately supplying two dissimilar fuels to an engine comprising automatic means for switching from a first fuel to a second fuel and vice versa at a predetermined load and speed of the engine; means purging the first fuel supplied to the engine to first return means and purging the second fuel supplied to the engine to second return means; and accumulator means to receive the purged fuel, said accumulator means communicating with the second fuel return means to receive the purged first fuel and communicating with the first fuel return means to receive the second purged fuel.

5. Apparatus to alternately supply two dissimilar fuels to an engine comprising a first fuel supply means; second fuel supply means; first fuel return means; second fuel return means; first control means to selectively supply fuel to the engine from the first or second supply means; second control means to selectively return the fuel from the engine to the first or second return means; means to purge and receive the fuel supplied to the engine while supplying another fuel, said means including accumulator means to receive the purged fuel; connecting means between the first fuel return means and the accumulator means to receive the second purged fuel; and connecting means between the second fuel return means and the accumulator means to receive the purged first fuel.

6. Apparatus to alternately supply two dissimilar fuels to an engine comprising supply means to the engine; return means from the engine; first and second fuel supply means; first and second fuel return means; first and second fuel by-pass means; first control means in the supply means to the engine to switch from the first fuel supply means to the second fuel supply means and vice versa; second control means in the second fuel return means to switch from the second fuel supply means to the first fuel by-pass means and vice versa; third control means in the return means from the engine to switch from the first fuel by-pass means to the second fuel by-pass means and vice versa; fourth control means in the first fuel return means to switch from the second fuel by-pass means to the first fuel supply means and vice versa; and means to purge and receive the fuel supplied to the engine while supplying the other fuel, said means including accumulator means in the first and second fuel by-pass means to receive the first fuel purged from the engine through the second fuel by-pass line and to receive the second fuel purged from the engine through the first fuel by-pass means.

7. Apparatus as defined in claim 6 including means to return the first purged fuel from the accumulator means to the first fuel return means, and means to return the second purged fuel from the accumulator means to the second fuel return line.

References Cited in the file of this patent

UNITED STATES PATENTS

| | | |
|---|---|---|
| 2,758,579 | Pinotti | Aug. 14, 1956 |
| 2,768,496 | Stamm et al. | Oct. 30, 1956 |